Figure 1:
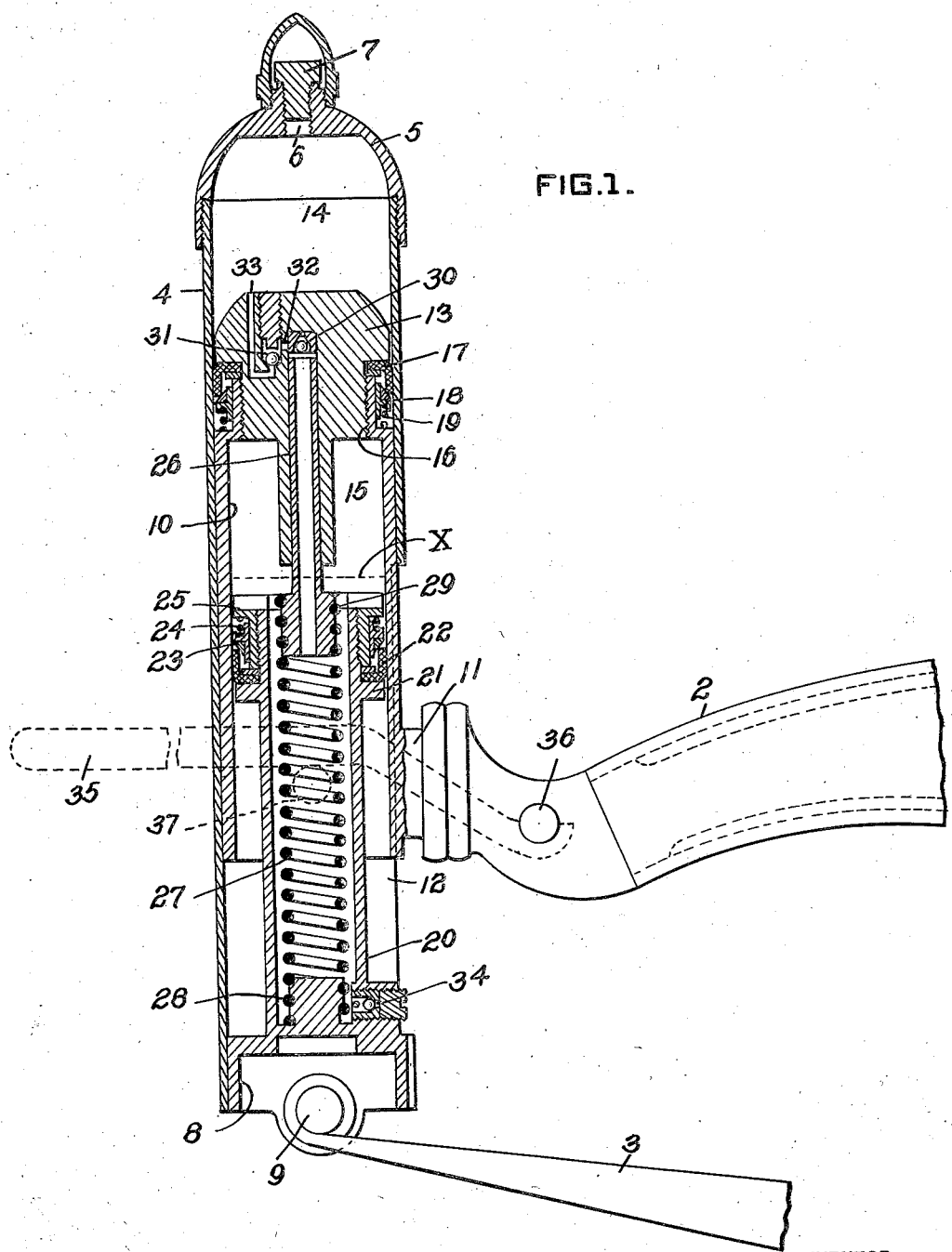

Aug. 18, 1925.

R. LIEBAU 1,550,081

AIR SPRING

Filed Feb. 26, 1919

WITNESSES
J. Herbert Bradley.

INVENTOR
Richard Liebau
By Jno. S. Green
Atty.

Patented Aug. 18, 1925.

1,550,081

UNITED STATES PATENT OFFICE.

RICHARD LIEBAU, OF NEW HAVEN, CONNECTICUT, ASSIGNOR TO THE WESTINGHOUSE AIR SPRING COMPANY, A CORPORATION OF PENNSYLVANIA.

AIR SPRING.

Application filed February 26, 1919. Serial No. 279,429.

*To all whom it may concern:*

Be it known that I, RICHARD LIEBAU, a citizen of the United States, and a resident of New Haven, in the county of New Haven and State of Connecticut, have made a new and useful Invention in Air Springs, of which the following is a specification.

This invention relates to air springs for vehicles and the object is to provide a spring whereby the load platform is supported relatively to the running gear by means of a vacuum and pressure.

In the drawings, Figure 1 is a view in sectional elevation of a spring embodying this invention in which the load platform is designated by 2 and the running gear by 3. The portion of the load platform shown may be one end member of the vehicle frame and the portion of the running gear shown may be the end of one of the steel springs in series with which the air spring operates.

The spring consists of a cylindrical housing member 4 closed at the top and a cap 5 provided with a vent 6 and a sealing plug 7. A bottom member 8 is fastened into the bottom of the tubular member 4 and carries a cross pin 9 passing through the eye of spring 3.

An inner cylindrical member 10 is telescopically arranged with the outer cylinder 4 and is secured to vehicle frame 2 by means of a pad 11 formed integral with the cylinder 10 and which is adapted to reciprocate within slot 12 cut for that purpose in the rear portion of cylinder member 4. Member 10 carries a plunger head 13 which divides the interior of the device into a vacuum chamber 14 and a pressure chamber 15.

Plunger head 13 is preferably threaded into the upper part of member 10 as shown at 16 and confines in place a cup leather packing 17 with its expander 18 and expander spring 19.

Bottom member 8 of the outer cylindrical member 4 is provided with an upstanding central column-like portion 20 which at its upper end is provided with an annular flange 21 extending out into close proximity to the interior surface of member 10 and which forms the seat for a cup leather packing 22 held in place by means of a cone expander 23, spring 24 and nut 25.

A pump barrel for the reception of pump plunger 26 is provided in plunger head 13 and plunger 26 is yieldingly held in place within the barrel by means of a coiled spring 27 which lies within the column-like member 20 and which at its lower end is secured to base 8 as shown at 28 and at its upper end to the lower portion of the pump plunger as shown at 29. The upper portion of the plunger carries a ball check 30 which cooperates with a ball check 31 and passages 32 and 33 in the plunger head to form a pump for pumping air from vacuum chamber 14 into pressure chamber 15.

An air valve 34 may, if desired, be provided for the purpose of charging pressure chamber 15 with air above atmospheric pressure if air at atmospheric pressure is not sufficient to support the load platform at the proper length, or the valve may be used for charging the spring with oil as it is desired to maintain oil within column-like member 27 and pressure chamber 15 to about the level indicated by the dotted line X.

In order to place the device in operation when the same is installed on a vehicle, it is necessary first to remove sealing plug 7 and then by means of a lever 35 which hooks under pins 36 and rests on pins 37 secured to opposite sides of cylindrical member 4 to depress cylindrical member 4 thereby causing plunger head 13 to approach the upper end of cylindrical member 4. This movement expels the air from vacuum chamber 14 and causes air to either pass cup leather packing 22 into pressure chamber 15 or check valve 34 into chamber 15. Oil by some suitable means is then introduced into the device up to the line X. The sealing plug 7 is then put in place and the lever 35 reversed. The load will then cause the plunger head 13 to assume substantially the position shown in Figure 1 or a position midway between the upper end of cylindrical member 4 and nut 25 which forms the top of column 20.

In this way the load platform is yieldingly suspended with relation to the running gear by means of the vacuum in chamber 14 and the pressure in chamber 15 and during the operation of the spring, that is the movements in extending and collapsing. The air pump in the plunger head operated by spring 27 will cause any air within vacuum chamber 14 to be pumped therefrom into pressure chamber 15.

Having thus described my invention what I claim is—

1. In an air spring, a piston secured to the load platform, a cylinder secured to the running gear and within which said piston is adapted to reciprocate, internal pumping means for maintaining a vacuum above said piston, and means for maintaining air pressure below said piston.

2. In combination with the load platform and the running gear of a vehicle, a pneumatic spring, comprising two relatively movable members so arranged and constructed as to enclose two separate chambers in one of which fluid pressure below atmosphere is maintained and in the other of which a fluid pressure above atmosphere is maintained by an internal pumping action and means for securing the members to the load platform and the running gear so that pressures in the two chambers co-operate in supporting the load platform on the running gear.

3. In an air spring, means providing two chambers separated by a piston, and an internal pump having its inlet connected to one chamber and its outlet to another for maintaining a substantially constant vacuum in one chamber and a variable fluid pressure in the other.

4. In an air spring, relatively movable members enclosing separate chambers, internal means for maintaining a vacuum pressure in one chamber and a superatmospheric pressure in the other chamber and means for causing said pressures to simultaneously co-operate in functioning as an elastic support.

5. In an air spring, a variable fluid pressure cushion chamber, a vacuum chamber, a movable member separating said chambers, positive internal means for transferring fluid from the vacuum chamber to the variable cushion chamber, and means whereby the pressures in said chambers operate in conjunction to support the load.

6. In an air spring, a variable fluid pressure cushion chamber, another chamber, positive internal means for exhausting air from said other chamber to create a vacuum therein, and means whereby said vacuum and the variable fluid pressure in said cushion chamber operate in conjunction in supporting the load.

7. In an air spring, axially aligned relatively movable members enclosing superposed chambers, positive internal means for maintaining a vacuum pressure in one chamber and a superatmospheric pressure in the other chamber and means for causing said pressures to simultaneously co-operate in functioning as an elastic support.

8. In an air spring, telescoping members enclosing separate axially aligned superposed chambers, positive internal means for maintaining a vacuum pressure in one chamber and a superatmospheric pressure in the other chamber and means for causing said pressures to simultaneously co-operate in functioning as an elastic support.

9. In an air spring, telescoping means forming separate chambers, a internal pump for maintaining a vacuum pressure in one chamber and a superatmospheric pressure in the other chamber and means for causing said pressures to simultaneously co-operate in functioning as an elastic support.

10. In combination with the running gear and load platform of a vehicle, a spring comprising two relatively movable members secured respectively to the running gear and load platform and constructed so as to form two chambers of variable volumetric capacity, adapted to co-operate in supporting the load and a pump enclosed by said members and arranged to maintain a subatmospheric pressure within one and a superatmospheric pressure within the other.

11. In combination with the steel springs and load platform of a vehicle, an air spring connected to operate in series with a steel spring in supporting the load platform and comprising two relatively movable members secured respectively to the steel spring and load platform and constructed so as to form two chambers adapted to co-operate one with the other and with the steel spring in supporting the load and a pump enclosed by said members and actuated by the relative movement therebetween for maintaining a subatmospheric pressure in one chamber and a superatmospheric pressure in the other.

In testimony whereof, I have hereunto subscribed my name this 2nd day of December, 1918.

RICHARD LIEBAU.